O. T. Bedell,
Slate Washer,
No. 60,849.   Patented Jan. 1, 1867.

Witnesses:
A. Leclery
G. W. Reed

Inventor
Otis T. Bedell

United States Patent Office.

OTIS T. BEDELL, OF NEW YORK, N. Y.

Letters Patent No. 60,849, dated January 1, 1867.

SLATE WASHER.

The Schedule referred to in these Letters Patent and making part of the same.

TO ALL WHOM IT MAY CONCERN:

Be it known that I, OTIS T. BEDELL, of the city, county, and State of New York, have invented a new and useful improvement in Slate Washers; and I do hereby declare that the following is a full, clear, and exact description of the same, reference being had to the accompanying drawing, making a part of this specification, in which—

Similar letters of reference indicate corresponding parts in both figures.

This invention consists in a slate washer composed of a compressible water receptacle formed of India rubber, or other suitable elastic material, and furnished with a wiper of sponge or other similar absorbent substance, whereby a very cleanly and convenient device for washing slates is obtained, and one that may be manufactured at an extremely moderate cost.

To enable others, skilled in the art, to understand the nature and construction of my invention, I will proceed to describe it with reference to the drawings.

Figure 2:
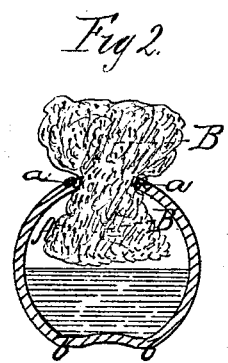
Figure 2 is a central vertical transverse section of the same.
Figure 1:
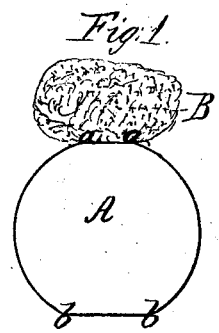
Figure 1 is a side elevation of a slate washer, constructed according to my invention.

The compressible vessel which constitutes the water receptacle of the washer is shown at A, and is made preferably of India rubber, and of a nearly spherical shape, and is furnished with a hole or orifice, $a\ a$, through which water may be poured into the aforesaid vessel A, and in which is inserted a piece, B, of sponge or other substance capable of readily absorbing water, and also of yielding up the same by compression, the innermost end of such sponge, or substance, being expanded within the interior of the vessel A as shown in fig. 2, while the outer end thereof is spread out or expanded at the exterior of the same, as represented in both the figures. That side of the vessel A opposite the orifice $a$, is made flat, or slightly concave, as at $b\ b$, in order to form a bottom which will retain the vessel A in position, with the wiper B uppermost, when placed upon a flat surface when not in use. The vessel A is first partially filled with water, as shown at $c$, in fig. 2, and the wiper B is then inserted in the orifice $a\ a$, as just hereinbefore set forth, with its lower end at a slight distance from the surface of the water in the vessel A, when the said vessel is in an upright position as just hereinbefore explained, in order that the water may not pass upward and saturate the wiper B when the device is not in use. In using the washer, the vessel A is grasped in the hand, and is compressed until the water is forced upward in contact with the innermost portion of the wiper B, whereupon a sufficient quantity of water passes through the said wiper by capillary attraction to properly moisten the outermost portion of the same; which being done, and the vessel A still held in the hand, the wiper B is applied to the surface of the slate to wash or cleanse the same, in substantially the same manner as an ordinary sponge. If desired, a perforated partition may be placed midway between the upper and lower portions of the vessel A, in order to reduce, in a measure, the sudden flowing of the water to the upper part thereof when the same is tilted or turned over. If desired, the vessel A may be made of hemispherical or other suitable form, but it is preferred to have it of nearly spherical shape, as hereinbefore described, inasmuch as in this case, by removing the wiper B, and emptying the water from the vessel A, the said vessel may be used as a common toy ball, thus adapting the device to the amusements of children, as well as to use in washing slates.

What I claim as new, and desire to secure by Letters Patent, is—

A slate washer composed of a compressible water vessel A, and absorbent wiper B, combined substantially as herein set forth.

OTIS T. BEDELL.

Witnesses:
A. LE CLERC,
G. W. REED.